US011832231B2

(12) United States Patent
Cui et al.

(10) Patent No.: US 11,832,231 B2
(45) Date of Patent: Nov. 28, 2023

(54) TECHNIQUES FOR GROUPING MULTIPLE SERVING COMPONENT CARRIERS

(71) Applicant: APPLE INC., Cupertino, CA (US)

(72) Inventors: Jie Cui, Cupertino, CA (US); Dawei Zhang, Cupertino, CA (US); Hong He, Cupertino, CA (US); Manasa Raghavan, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 203 days.

(21) Appl. No.: 17/357,544

(22) Filed: Jun. 24, 2021

(65) Prior Publication Data

US 2022/0038224 A1    Feb. 3, 2022

Related U.S. Application Data

(60) Provisional application No. 63/058,629, filed on Jul. 30, 2020.

(51) Int. Cl.
*H04W 72/0453* (2023.01)
*H04L 5/00* (2006.01)

(52) U.S. Cl.
CPC ......... *H04W 72/0453* (2013.01); *H04L 5/001* (2013.01)

(58) Field of Classification Search
CPC ................. H04W 72/0453; H04L 5/001
See application file for complete search history.

(56) References Cited

U.S. PATENT DOCUMENTS

| 9,629,160 | B1 * | 4/2017 | Sevindik | H04W 72/0453 |
| 2008/0159214 | A1 * | 7/2008 | Majonen | H04L 1/20 |
| | | | | 455/452.2 |
| 2010/0113078 | A1 * | 5/2010 | Farajidana | H04B 7/0632 |
| | | | | 455/507 |
| 2014/0050194 | A1 * | 2/2014 | Gaal | H04W 72/0453 |
| | | | | 370/330 |
| 2015/0289218 | A1 * | 10/2015 | Uchino | H04W 56/0045 |
| | | | | 370/329 |
| 2018/0167181 | A1 * | 6/2018 | Montreuil | H04L 5/0007 |
| 2018/0176810 | A1 * | 6/2018 | Thangarasa | H04W 76/11 |
| 2020/0052869 | A1 * | 2/2020 | Gheorghiu | H04W 72/0453 |

\* cited by examiner

*Primary Examiner* — Kevin C. Harper
(74) *Attorney, Agent, or Firm* — Dorsey & Whitney LLP

(57) ABSTRACT

Techniques for grouping multiple serving component carriers (CCs) are disclosed. In one example, a frequency separation that defines a frequency range from a lower bound frequency to a higher bound frequency for each CC group of a plurality of CC groups may be determined, wherein a difference between the lower bound frequency and the higher bound frequency of each CC group may be equal to the frequency separation. A frequency of a first CC from a collection of CCs may be determined. The first CC may be assigned to a first CC group, of the plurality of CC groups, wherein the first CC group may have a frequency range that includes the frequency of the first CC.

15 Claims, 12 Drawing Sheets

| CC type | CC index | Group (if N=1, M=2N+1) | Group (if N=2, M=2N+1) |
|---|---|---|---|
| PCC | CC1 | Group 1 | Group 1 |
| FD gap | FD gap | | |
| SCC | CC2 | Group 2 | Group 2 |
| SCC | CC3 | Group 2 | Group 2 |
| SCC | CC4 | Group 2 | Group 2 |
| SCC | CC5 | Group 3 | Group 2 |
| SCC | CC6 | Group 3 | Group 2 |
| SCC | CC7 | Group 3 | Group 3 |
| SCC | CC8 | Group 4 | Group 3 |
| SCC | CC9 | Group 4 | Group 3 |
| SCC | CC10 | Group 4 | Group 3 |
| SCC | CC11 | Group 5 | Group 3 |
| SCC | CC12 | Group 5 | Group 4 |
| SCC | CC13 | Group 5 | Group 4 |
| SCC | CC14 | Group 6 | Group 4 |

FIG. 2

| CC type | CC index | Group |
|---|---|---|
| PCC | CC1 | Group 1 |
| FD gap | FD gap | |
| SCC | CC2 | Group 2 |
| SCC | CC3 | Group 2 |
| SCC | CC4 | Group 2 |
| SCC | CC5 | Group 2 |
| SCC | CC6 | Group 2 |
| SCC | CC7 | Group 2 |
| SCC | CC8 | Group 2 |
| SCC | CC9 | Group 2 |
| SCC | CC10 | Group 2 |
| SCC | CC11 | Group 2 |
| SCC | CC12 | Group 2 |
| SCC | CC13 | Group 2 |
| SCC | CC14 | Group 2 |

FIG. 4

| CC type | CC index | Group: ceiling(Z/Y)+3 | Frequency range |
|---|---|---|---|
| PCC | CC1 | Group 1 | |
| FD gap | FD gap | | |
| SCC | CC2 | Group 1 | Y MHz |
| SCC | CC3 | Group 1 | |
| SCC | CC4 | Group 1 | |
| SCC | CC5 | Group 2 | |
| SCC | CC6 | Group 2 | |
| SCC | CC7 | Group 2 | Y MHz |
| SCC | CC8 | Group 2 | |
| SCC | CC9 | Group 2 | |
| SCC | CC10 | Group 3 | |
| SCC | CC11 | Group 3 | |
| SCC | CC12 | Group 3 | Y MHz |
| SCC | CC13 | Group 3 | |
| SCC | CC14 | Group 3 | |

FIG. 6

TECHNIQUES FOR GROUPING MULTIPLE SERVING COMPONENT CARRIERS

CROSS-REFERENCE TO RELATED APPLICATION(S)

This application claims the benefit of U.S. Provisional Application No. 63/058,629, filed Jul. 30, 2020, which is hereby incorporated by reference herein in its entirety.

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a table showing examples of grouping CCs using the process of FIG. 1.

FIG. 4 illustrates a table showing an example of grouping CCs using the process of FIG. 3.

FIG. 6 illustrates a table showing an example of grouping CCs using the process of FIG. 5.

DETAILED DESCRIPTION

Figure 1:
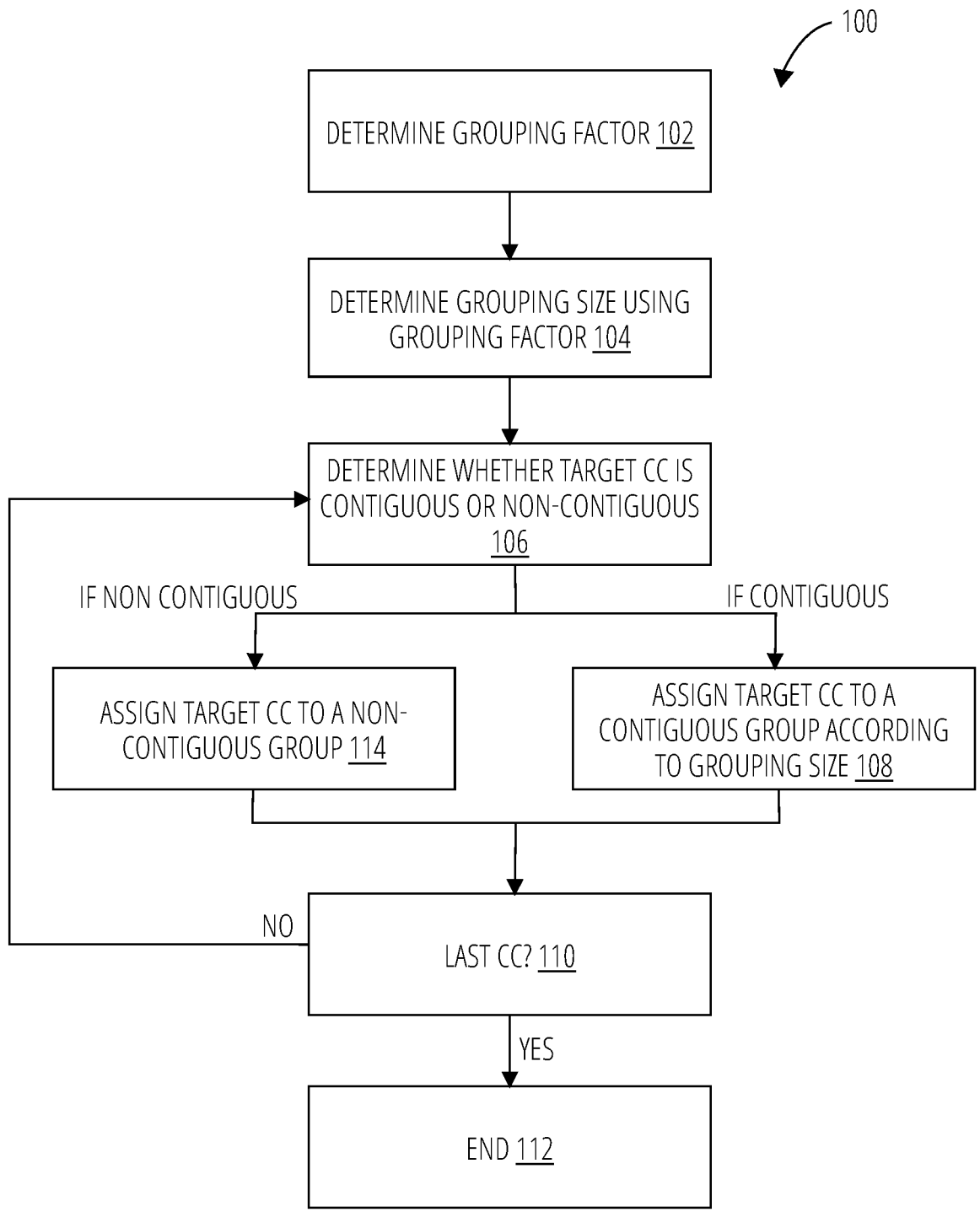
FIG. 1 illustrates a grouping process for a collection of CCs in accordance with some embodiments.

In 5G New Radio (NR) Frequency Range 2 (FR2), multiple serving component carrier (CC) signals may be configured for a UE for aggregation. For example, up to 15 CCs may be configured in FR2 non-contiguous carrier aggregation (CA) (e.g., CA_n261(A-7O)). As serving CCs increase in FR2 CA, searcher resource(s) (e.g., in NR, 2 searcher resources) may be shared among the serving CCs. The carrier specific scaling factor (CSSF) values for FR2 CA and serving CC measurement delay are specified, for example, in 3GPP Technical Specification (TS) 38.133 Tables 9.1.5.1.2-1 and 9.2.5.2-1.

For example, if no discontinuous reception (DRX) is used, no measurement gap (MG) is configured, and no radio link monitoring (RLM) and/or beam-management is colliding with Synchronization Signal Block-based Measurement Timing configuration (SMTC), the delay may be 24*1*1*SMTC*14=13.44 seconds for SMTC=40 ms and for a PC1/2/3 UE. This 13.44 second result is much longer than 5 seconds, which is specified in the detectable/undetectable cell description of TS38.133. Further, if a PC4 UE is used, the delay may be much longer. TS38.133, further specifies that, in handover, in the interruption requirement a cell is known if it has been meeting the relevant cell identification requirement during the last 5 seconds; otherwise it is unknown.

The serving CC measurement may be delayed too much when the aggregated number of CCs increases but the searcher resource number is assumed to be 2 in NR, especially for FR2 CA. Here, to avoid a potentially serious impact to mobility performance, in some embodiments, the present disclosure considers how to shorten measurement delay for serving CCs in FR2 CA. In some embodiments, CC grouping and/or limiting techniques are used to reduce measurement delay, where the CCs may be in FR2.

Solution 1

In some embodiments, a relative grouping technique is provided, where a factor N is used to represent a range of adjacent CC which can share the same channel quality and grouping as a target center CC. For example, a measurement of one target CC may represent the quality of all CCs adjacent to this target CC and in the same group as the target CC. Here, a total of M=(2*N)+1 number of CCs may share the same measurement results.

In some embodiments, if the CCs are not adjacent to each other (e.g., non-contiguous CCs to each other), they cannot share the same measurement results. In some embodiments, a UE only needs to perform a measurement on the target center CC of one or more of the groups. In some embodiments, the factor N is specified based on a particular frequency range. In some embodiments, the factor N is configured by a network.

Solution 2

In some embodiments, another relative grouping technique is provided, where if CCs are not adjacent to each other (e.g., CCs are non-contiguous CCs to each other), the CCs cannot share the same measurement results and cannot be in the same group. For example, if CCs are intra-band contiguous, those CCs can be grouped together in one group. Other CCs that are not intra-band contiguous can be grouped together in a different group. In some embodiments, a UE only needs to perform a measurement on a single CC of one or more of the groups.

Solution 3

In some embodiments, an absolute grouping technique is provided, where a frequency separation Y (MHz or GHz) is used as a predetermined CC group size in the frequency domain. In some embodiments, a UE may check from a first CC to a last CC to determine which CCs can be contained in a single group. For example, a UE may determine that CCs can be contained in the single group by determining that the frequency separation of these CCs (e.g., serving CCs) of the UE in the frequency domain (e.g. from the lower bound of a lowest CC to the higher bound of highest CC in the frequency domain) is smaller than or equal to group size Y. In some embodiments, the grouping starting point is from the lowest CC in the frequency domain. In some embodiments, the grouping staring point is from the highest CC in the frequency domain. In some embodiments, the frequency separation and/or grouping starting point is configured by network signaling to the UE.

In some embodiments, the frequency separation of CCs complies with a predetermined group size. For example, when frequency separation is performed, the number of CCs in the same group may not exceed a predetermined group size.

In some embodiments, a measurement of any serving CC (e.g., target CC) in one group can represent channel quality of other CCs in the same group with this target CC. In some embodiments, if the CCs are not in the same group with the target CC, they cannot share the same measurement results with target CC In some embodiments, a UE only needs to perform a measurement on the target center CC for a certain group. In some embodiments, a UE only needs to perform a measurement on any CC in the same group.

Solution 4

In some embodiments, a limiting technique is provided, where the total number of serving CCs to be monitored by a UE is limited. In some embodiments, the number and/or index of serving CCs to be monitored is selected according to a UE implementation. For example, 8 CCs may be selected for UE monitoring out of 15 possible CCs that are available. In some embodiments, a network may configure the UE for the number of serving CCs to be monitored.

Solution 5

In some embodiments, a combination of solution 2 and solution 3 may be provided. Here, for example, CCs are first grouped into either a contiguous group or a non-contiguous group (solution 2). Then, for the contiguous group, the absolute grouping technique (solution 3) is performed.

The various solutions will now be explained in further detail and with reference to the accompanying figures. It should be noted that each of the solutions may be implemented by a UE (e.g., the UE performs one or more blocks of the disclosed processes) or by a combination of the UE and other system components, that the order of blocks described in the disclosed processes may be different than that shown in the figures, and that one or more blocks of the disclosed processes may be combined and/or removed.

FIG. 1 shows a grouping process 100 for a collection of CCs in accordance with some embodiments. In some embodiments, process 100 is a relative grouping process.

At block 102, a grouping factor N is determined. In some embodiments, the factor N reflects a range of adjacent CCs to a target center CC that share the same channel quality and grouping as the target center CC. Accordingly, for a group of CCs that are grouped according to the grouping factor N, a quality measurement of the target center CC may also represent the quality of the other CCs in the group—namely, the N factor CCs adjacent to the target center CC. Similarly, for a group of CCs that are grouped according to the grouping factor N, a quality measurement of a target CC other than the center CC may also represent the quality of the target CC and the other CCs of the group—here, the center CC and other N factor CCs adjacent to the center CC. In some embodiments, a UE may only measure quality of a single CC (e.g., the center CC or another CC) of each group of CCs grouped according to the grouping factor N. In some embodiments, the UE may measure quality of a plurality of CCs within each group of CCs grouped according to the grouping factor N.

In some embodiments, the factor N is specified based on a particular frequency range associated with the CCs. In some embodiments, the factor N is configured by a network. In some embodiments, the factor N is configured by the UE itself due to a UE configuration or specification. In some embodiments, N=1, 2, or 3.

At block 104, a grouping size M is determined using the grouping factor N. In some embodiments, the grouping size M=(2*N)+1. In some embodiments, M number of CCs may share the same measurement results. For example, a UE may measure a single CC of a group of M CCs At block 106, a determination is made as to whether a target CC for grouping is contiguous or non-contiguous. In some embodiments, if a target CC is not adjacent to one or more other CCs (e.g., the target CC is non-contiguous to another CC), the target CC cannot share the same measurement results as other CCs and is considered non-contiguous. In some embodiments, if the target CC is adjacent to one or more CCs, the target CC is considered contiguous. In some embodiments, the determination of block 106 includes determining whether a target CC is a primary component carrier (PCC) or a secondary component carrier (SCC). For example, if the target CC is a PCC, then the target CC may be determined as non-contiguous. If the target CC is a SCC, then the target CC may be determined as contiguous. In some embodiments, the determination of block 106 includes determining whether a target CC is adjacent to a frequency domain (FD) gap. For example, if the target CC is adjacent to an FD gap and is not adjacent to another CC, the target CC may be considered a non-contiguous CC. If the target CC is adjacent to an FD gap but also adjacent to another CC, the target CC may be considered a contiguous CC. In some embodiments, the contiguous CCs are intraband CCs.

If the target CC is determined as non-contiguous, process 100 continues to block 110. If the target CC is determined as contiguous, process 100 continues to block 108.

At block 108, the target CC for grouping is assigned to a contiguous group according to the grouping size M. In some embodiments, each target CC is assigned to a group until M number of CCs have been assigned to the group. After block 108, process 100 then continues to block 112.

For example, at each occurrence of block 108, each target CC may be assigned to a first group until M number of CCs have been assigned to the first group. After M number of CCs are present in the first group, at subsequent occurrences of block 108, each target CC may be assigned to a second group until M number of CCs have been assigned to the second group. After M number of CCs are present in the second group, at subsequent occurrences of block 108, each target CC may be assigned to a third group until M number of CCs have been assigned to the third group. This continues similarly for remaining CCs during each remaining occurrence of block 108.

At block 112, the target CC for grouping is assigned to a non-contiguous group. In some embodiments, a single non-contiguous group is present. In some embodiments, multiple non-contiguous groups are present. Process 100 then continues to block 114.

At block 114, a determination as to whether the target CC for grouping is the last CC of the collection of CCs. If the target CC is the last CC, process 100 ends at block 110. Otherwise, if the target CC is not the last CC, process 100 continues to block 106, where another target CC for grouping of the collection of CCs is analyzed according to process 100.

FIG. 2 shows a table that reflects exemplary grouping using process 100. In the illustrated table, exemplary groupings of 14 CCs when N=1 and when N=2 are shown.

In the examples shown, CC1 is assigned to a non-contiguous group, Group 1, because it is adjacent to the FD gap and is not adjacent to another CC. CC1 may also be assigned to the non-contiguous group because it is a PCC. In the examples shown, CC2-CC14 are considered contiguous because they are each adjacent to at least one other CC. CC2-CC14 may also be assigned to a contiguous group because they are each an SCC. Since CC2-CC14 are contiguous CCs, they are grouped according to the grouping size M.

In the example shown, when N=1, the grouping size M=2*(1)+1=3. Accordingly, the contiguous CCs, CC2 through CC14, are grouped according to the M=3 grouping size (e.g., M=3 CCs are present in each group). For example, CC2-CC4 are assigned to Group 2. CC5-CC7 are assigned to Group 3. CC8-CC10 are assigned to Group 4. CC11-CC13 are assigned to Group 5. CC14 is assigned to Group 6. Thus, for example, a channel quality measurement of CC3 of Group 2 can be used to represent the channel quality of all CCs in Group 2—namely, CC2 and CC4. Here, for example, a UE determining channel quality may assume CC2, CC3, and CC4 have the same channel quality since they are part of the same group (Group 2), and the UE may only measure quality of a single CC of Group 2 to determine channel quality of each CC in Group 2 rather than measure quality of all or multiple CCs in Group 2. The UE may measure the center CC (e.g. CC3, CC6, CC9, CC12) or any other CC of each group to determine channel quality for the CCs of each group.

In the example shown, when N=2, the grouping size M=2*(2)+1=5. Accordingly, the contiguous CCs, CC2-CC14, are grouped according to the M=5 grouping size (e.g., M=5 CCs are present in each group). For example, CC2-CC6 are assigned to Group 2, CC7-CC11 are assigned to Group 3, and CC12-CC14 are assigned to Group 4. Like the example above where N=1, the channel quality measurement of a single CC in a group can be used to represent the channel quality of all CCs in that group, and the UE may measure the center CC or any other CC of each group to determine channel quality of the CCs of each group.

Figure 3:
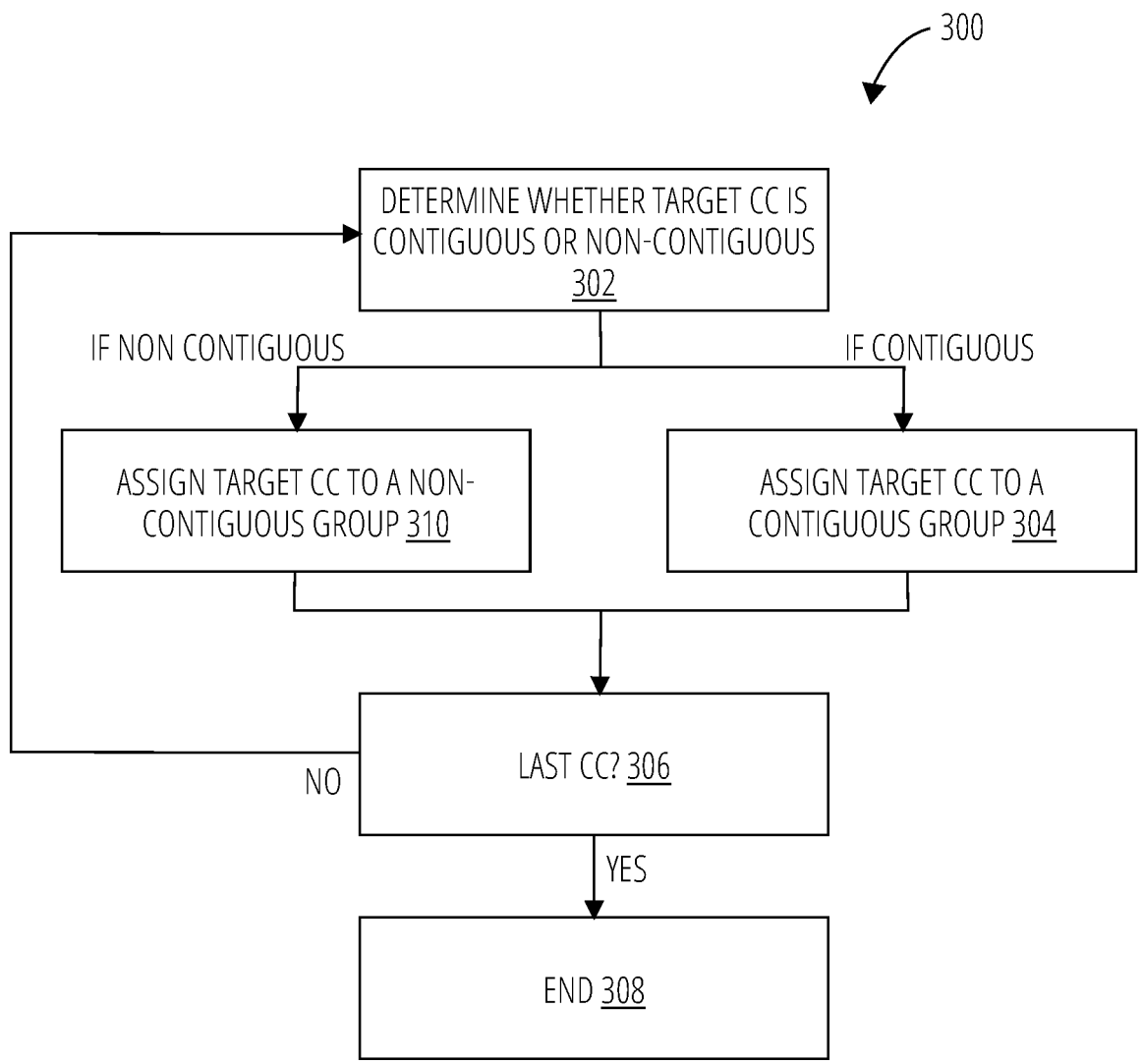
FIG. 3 illustrates another grouping process for a collection of CCs in accordance with some embodiments.

FIG. 3 shows a grouping process 300 for a collection of CCs in accordance with some embodiments.

At block 302, a determination is made as to whether a target CC for grouping is contiguous or non-contiguous. Like in process 100 discussed above, in some embodiments, if a target CC is not adjacent to one or more other CCs (e.g., the target CC is non-contiguous to another CC), the target CC cannot share the same measurement results as other CCs and is considered non-contiguous. In some embodiments, if the target CC is adjacent to one or more CCs, the target CC is considered contiguous. In some embodiments, the determination of block 302 includes determining whether a target CC is a PCC or an SCC. For example, if the target CC is a PCC, then the target CC may be determined as non-contiguous. If the target CC is a SCC, then the target CC may be determined as contiguous. In some embodiments, the determination of block 302 includes determining whether a target CC is adjacent to a frequency domain (FD) gap. For example, if the target CC is adjacent to an FD gap and is not adjacent to another CC, the target CC may be considered a non-contiguous CC. If the target CC is adjacent to an FD gap but also adjacent to another CC, the target CC may be considered a contiguous CC. In some embodiments, the contiguous CCs are intraband CCs.

If the target CC is determined as non-contiguous, process 300 continues to block 310. If the target CC is determined as contiguous, process 300 continues to block 304.

At block 304, the target CC for grouping is assigned to a contiguous group. In some embodiments, a single contiguous group is present to which a target CC is assigned to. After block 304, process 100 then continues to block 306.

At block 310, the target CC for grouping is assigned to a non-contiguous group. In some embodiments, a single non-contiguous group is present to which a target CC is assigned to. Process 300 then continues to block 306.

At block 306, a determination as to whether the target CC for grouping is the last CC of a collection of CCs. If the CC is the last CC, process 300 ends at block 308. Otherwise, if the target CC is not the last CC of the collection, process 300 continues to block 302, where another target CC for grouping of the collection of CCs is analyzed according to process 300.

FIG. 4 shows a table that reflects an exemplary grouping using process 300. In the illustrated table, an exemplary grouping of 14 CCs is shown.

In the example shown, CC1 is assigned to a non-contiguous group, Group 1, because it is adjacent to the FD gap and is not adjacent to another CC. CC1 may also be assigned to the non-contiguous group because it is a PCC. In the example shown, CC2-CC14 are assigned to the contiguous group, Group 2, because they are each adjacent to at least one other CC. CC2-CC14 may also be assigned to the contiguous group, Group 2, because they are each an SCC.

In the example shown, CC2-CC14 are assigned to Group 2. Thus, for example, a channel quality measurement of any CC of Group 2 can be used to represent the channel quality of all CCs in Group 2. For example, a UE determining channel quality may assume CC2-CC14 have the same channel quality since they are part of the same group (Group 2), and the UE may only measure quality of a single CC of Group 2 to determine channel quality of each CC in Group 2 rather than measure quality of all or multiple CCs in Group 2. The UE may measure the center CC or any other CC of Group 2 to determine channel quality for the CCs of Group 2.

Figure 5:
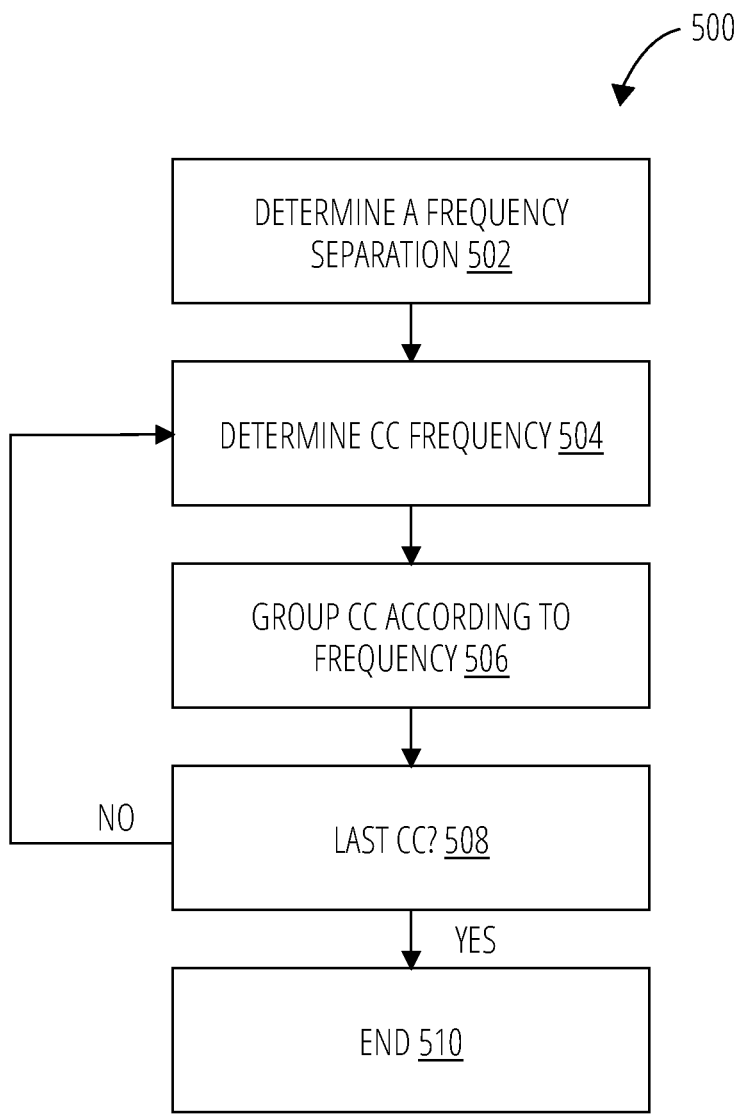
FIG. 5 illustrates another grouping process for a collection of CCs in accordance with some embodiments.

FIG. 5 shows a grouping process 500 for grouping a collection of CCs in accordance with some embodiments. In some embodiments, process 500 is an absolute grouping process. In some embodiments, a UE checks a collection of CCs, from a first CC to a last CC, to group each CC in a particular group.

At block 502, a frequency separation Y for grouping a collection of CCs in the frequency domain is determined. In some embodiments, the frequency is in MHz. In some embodiments, the frequency is in GHz. In some embodiments, the frequency separation Y reflects a predetermined group size. In some embodiments, the frequency separation Y is configured by network signaling.

In some embodiments, the frequency separation Y defines frequency ranges or bands, each corresponding to a group, within which each of the target serving CCs are grouped. For example, each group has a frequency range or band that spans from a lower bound frequency to a higher bound frequency, where the difference between the lower bound and higher bound is equal to the frequency separation Y.

For example, the frequency separation Y=(higher bound frequency)−(lower bound frequency). For example, the frequency separation Y may equal 100 MHz. In this example, for a first group, a lower bound frequency for the group may equal 600 MHz and the higher bound frequency for the group may equal 700 MHz, where 100 MHz=700 MHz−600 MHz. Accordingly, a first group may span a frequency range of 600 to 700 MHz. Similarly, a second group may span the frequency ranges 700 MHz to 800 MHz, a third group may span the frequency ranges 800 MHz to 900 MHz, and subsequent groups may be similarly defined. Target CCs may then be grouped with these groups. For example, a target CC having a frequency of 650 MHz would be grouped in the first group with spans a frequency range of 600 to 700 MHz, while a target CC having a frequency of 820 MHz would be grouped in the third group which spans a frequency range of 800 to 900 MHz.

At block 504, a target CC frequency is determined. In some embodiments, the target CC frequency is the bandwidth frequency of the target CC. In some embodiments, process 500 selects a target CC for analysis starting at the lowest frequency CC of the collection of CCs and increments upward to the next lowest at each instance of block 504. In some embodiments, process 500 selects a target CC for analysis starting at the highest frequency CC of the collection of CCs and increments downward to the next highest at each instance of block 504. In some embodiments, selection of a target CC is configured by network signaling.

At block 506, the target CC is grouped within or assigned to a particular frequency separation group according to its frequency. In some embodiments, the target CC type (e.g., PCC or SCC) and/or if a target CC is non-contiguous (e.g., non-contiguous intraband) with other CCs does not impact the group it is placed in or assigned to. In some embodiments, the number of CCs within or assigned to a one or more of the groups is not fixed or limited. In some embodiments, the number of CCs within or assigned to one or more of the groups does not exceed a predetermined threshold group size. In some embodiments, the predetermined threshold is configured from a network. In some embodiments, the predetermined threshold is standardized. For example, a UE may be configured via the standardization.

At block 508, if the target CC is the last CC of the collection of CCs, process 500 ends at block 510. If the target CC is not the last CC of the collection of CCs, process 500 proceeds to block 504, where the frequency of a new target CC of the collection of CCs is determined.

In some embodiments, after grouping, a quality measurement of any CC (e.g., center CC or any other CC) in a particular group can represent channel quality of all other CCs in the same group. In some embodiments, if one or more CCs are not in the same group with as a CC being measured, they cannot share the same measurement results with measured CC. In some embodiments, a UE only performs a quality measurement on the target center CC for a certain group. In some embodiments, a UE performs a quality measurement on any single or multiple CCs (e.g., not necessarily the center CC) in a group.

FIG. 6 shows a table that reflects an exemplary grouping using process 500. In the illustrated table, an exemplary grouping of 14 CCs is shown.

In the example shown, a frequency spectrum Z includes the frequencies within which CC1 through CC14 fall, and the frequency separation Y (in MHz) divides the Z spectrum into three groups, where the difference between a lower bound and higher bound of each group is equal to the frequency separation Y. In the example shown, CC1-CC4 assigned to Group 1. Here, even though CC1 is non-contiguous and separated from CC2 and contiguous CCs by the FD gap, CC1 is still assigned to Group 1 because the separation Y spans a frequency range large enough to encompass the FD gap. In the example shown, CC5-CC9 are assigned to Group 2, and CC10-CC14 are assigned to Group 3.

Thus, for example, a channel quality measurement of any CC of Group 1 can be used to represent the channel quality of all CCs in Group 1. For example, a UE determining channel quality may assume CC1-CC4 have the same channel quality since they are part of the same group (Group 1), and the UE may only measure quality of a single CC of Group 1 to determine channel quality of each CC in Group 1 rather than measure quality of all or multiple CCs in Group 1. The same holds for Groups 2 and 3. The UE may measure the center CC or any other CC of a group. In some embodiments, the UE may measure one or multiple CCs of a group.

Figure 7:
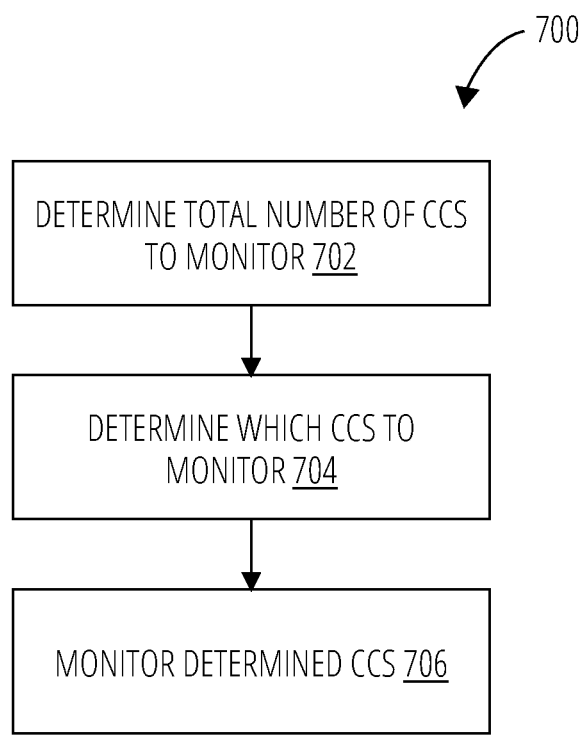
FIG. 7 illustrates a process of limiting CC monitoring in accordance with some embodiments.

FIG. 7 shows a process 700 in accordance with some embodiments. Process 700 is a limiting technique, where the total number of serving CCs to be monitored by a UE is limited. In some embodiments, the number and/or index of serving CCs to be monitored is selected according to a UE implementation. Process 700 will now be explained.

At block 702, a total number of CCs to monitor is determined. In some embodiments, at block 702, the total number of CCs available for monitoring is determined, and total number of CCs that the UE will monitor of these total available CCs is determined. In some embodiments, a network configures a UE with the total number of CCs it will monitor. In some embodiments, the UE is configured via its own implementation. For example, 15 CCs may be available for a UE to monitor. However, the UE may determine that only 8 of the 15 CCs should be monitored. In some embodiments, a single CC is available to be monitored. In some embodiments, a plurality of CCs are available to be monitored and a single CC of the available is determined to be monitored. In some embodiments, a plurality of CCs are available to be monitored and a plurality of CCs of the available are determined to be monitored.

At block 704, the CCs to be monitored is/are determined. In some embodiments, an identity (e.g., index) of the CCs to be monitored is/are determined. In some embodiments, the determination is random. For example, following the example discussed with respect to block 702, 8 random CCs of the 15 available CCs are determined or selected for monitoring. In some embodiments, the determination is non-random. In some embodiments, the determination selects a particular range or pattern of CCs. For example, of the 15 available CCs, CC1-CC8 are selected, CC7-CC15 are selected, or every odd or even CC of the available CCs are selected, such that the total number of selected CCs to monitor is equal to the value determined in block 702.

At block 706, the determined CCs are monitored. In some embodiments, channel quality of the determined CCs are monitored by a UE.

Figure 8:
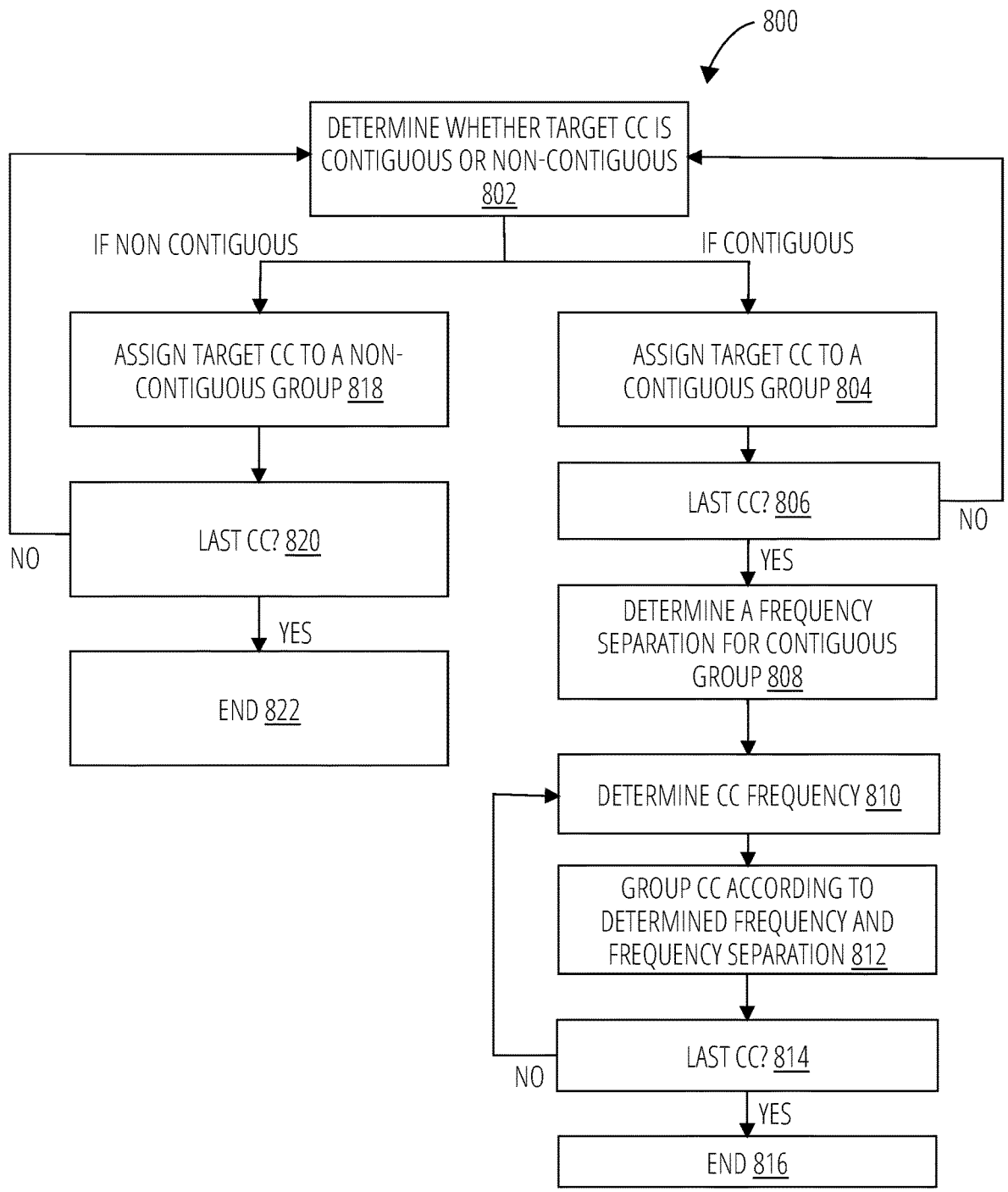
FIG. 8 illustrates another grouping process for a collection of CCs in accordance with some embodiments.

FIG. 8 shows a process 800 for grouping a collection of CCs in accordance with some embodiments. Process 800 is a combination of process 300 (shown in FIG. 3) and process 500 (shown in FIG. 5). For example, in process 800, a collection of CCs may be grouped as either a contiguous CC or a non-contiguous CC (e.g., as discussed regarding process 300). Contiguous CCs may then be grouped using a frequency separation Y (e.g., as discussed regarding process 500). For brevity, for blocks of process 800 that overlap with processes 300 and 500, reference is made to the applicable block(s) of processes 300 and 500, discussed above.

At block 802, a determination is made as to whether a target CC for grouping is contiguous or non-contiguous. The determination at block 802 is the same or substantially the same as block 302 in process 300 and description regarding block 302 applies to block 802.

If the target CC is determined as non-contiguous, process 800 continues to block 818. At block 818, the target CC for grouping is assigned to a non-contiguous group. In some embodiments, a single non-contiguous group is present to which a target CC is assigned to. Process 800 then continues to block 820 where a determination is made as to whether the target CC for grouping is the last CC of a collection of CCs. If the CC is the last CC, process 800 ends at block 822. Otherwise, if the target CC is not the last CC, process 800 continues to block 802, where another target CC for grouping of the collection of CCs is analyzed according to process 800.

Back to block 802, if the target CC is determined as contiguous, process 800 continues to block 804. At block 804, the target CC for grouping is assigned to a contiguous group. In some embodiments, a single contiguous group is present to which a target CC is assigned to. After block 804, process 800 then continues to block 806.

At block 806, a determination is made as to whether the target CC for grouping is the last CC of the collection of CCs. If the CC is the last CC, process 800 continues to block 808. Otherwise, if the target CC is not the last CC, process 800 continues to block 802, where another target CC for grouping of the collection of CCs is analyzed according to process 800.

At block 808, a frequency separation Y for grouping contiguous CCs in the frequency domain is determined. In some embodiments, the frequency is in MHz. In some embodiments, the frequency is in GHz. In some embodiments, the frequency separation Y reflects a predetermined group size. In some embodiments, the frequency separation Y is configured by network signaling. The determination at block 808 is the same or substantially the same as block 502 in process 500 and description regarding block 502 applies to block 808.

At block 810, a target CC frequency is determined. The determination at block 810 is the same or substantially the same as block 504 in process 500 and description regarding block 504 applies to block 810.

At block 812, the target CC is grouped within a particular frequency separation group of the contiguous CCs according to its frequency. The grouping at block 812 is the same or substantially the same as block 506 in process 500 and description regarding block 506 applies to block 812.

At block 814, if the target CC is the last CC of the contiguous CCs, process 800 ends at block 816. If the target CC is not the last CC of the contiguous CCs, process 800 proceeds to block 810, where the frequency of a new target CC of the contiguous CCs is determined.

Figure 9:
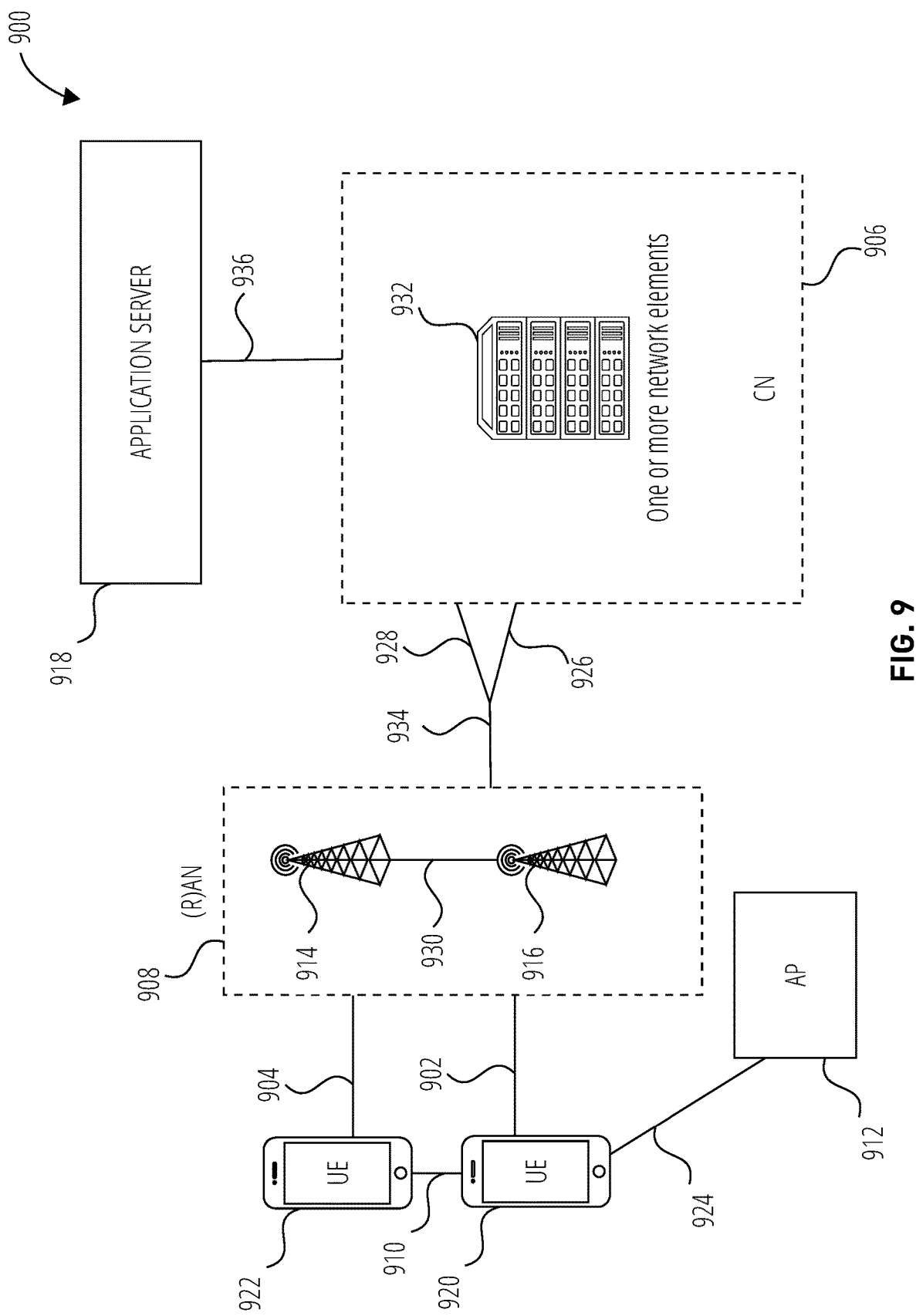
FIG. 9 illustrates a network system architecture in accordance with some embodiments.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 922 and UE 920. In this example, the UE 922 and the UE 920 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 922 and/or the UE 920 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 922 and UE 920 may be configured to connect, for example, communicatively couple, with an access node or radio access node (shown as (R)AN 908). In embodiments, the (R)AN 908 may be an NG RAN or a SG RAN, an E-UTRAN, or a legacy RAN, such as a UTRAN or GERAN. As used herein, the term "NG RAN" or the like may refer to a (R)AN 908 that operates in an NR or SG system, and the term "E-UTRAN" or the like may refer to a (R)AN 908 that operates in an LTE or 4G system. The UE 922 and UE 920 utilize connections (or channels) (shown as connection 904 and connection 902, respectively), each of which comprises a physical communications interface or layer (discussed in further detail below).

In this example, the connection 904 and connection 902 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 922 and UE 920 may directly exchange communication data via a ProSe interface 910. The ProSe interface 910 may alternatively be referred to as a sidelink (SL) interface 910 and may comprise one or more logical channels, including but not limited to a PSCCH, a PSSCH, a PSDCH, and a PSBCH.

The UE 920 is shown to be configured to access an AP 912 (also referred to as "WLAN node," "WLAN," "WLAN Termination," "WT" or the like) via connection 924. The connection 924 can comprise a local wireless connection, such as a connection consistent with any IEEE 802.11 protocol, wherein the AP 912 would comprise a wireless fidelity (Wi-Fi®) router. In this example, the AP 912 may be connected to the Internet without connecting to the core network of the wireless system (described in further detail below). In various embodiments, the UE 920, (R)AN 908, and AP 912 may be configured to utilize LWA operation and/or LWIP operation. The LWA operation may involve the UE 920 in RRC_CONNECTED being configured by the RAN node 914 or the RAN node 916 to utilize radio resources of LTE and WLAN. LWIP operation may involve the UE 920 using WLAN radio resources (e.g., connection 924) via IPsec protocol tunneling to authenticate and encrypt packets (e.g., IP packets) sent over the connection 924. IPsec tunneling may include encapsulating the entirety of original IP packets and adding a new packet header, thereby protecting the original header of the IP packets.

The (R)AN 908 can include one or more AN nodes, such as RAN node 914 and RAN node 916, that enable the connection 904 and connection 902. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 900 (e.g., an eNB). According to various embodiments, the RAN node 914 or RAN node 916 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 914 or RAN node 916 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 914 or RAN node 916); a MAC/PHY split wherein RRC, PDCP, RLC, and MAC layers are operated by the CRAN/vBBUP and the PHY layer is operated by individual RAN nodes (e.g., RAN node 914 or RAN node 916); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 914 or RAN node 916 to perform other virtualized applications. In some implementations, an individual RAN node may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the (R)AN 908 (not shown) or by a server pool in a similar manner as the CRAN/vBBUP. Additionally, or alternatively, one or more of the RAN node 914 or RAN node 916 may be next generation eNBs (ng-eNBs), which are RAN nodes that provide E-UTRA user plane and control plane protocol terminations toward the UE 922 and UE 920, and are connected to an SGC via an NG interface (discussed infra). In V2X scenarios one or more of the RAN node 914 or RAN node 916 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 914 and/or the RAN node 916 can terminate the air interface protocol and can be the first point of contact for the UE 922 and UE 920. In some embodiments, the RAN node 914 and/or the RAN node 916 can fulfill various logical functions for the (R)AN 908 including, but not limited to, radio network controller (RNC) functions such as radio bearer management, uplink and downlink dynamic radio resource management and data packet scheduling, and mobility management.

In embodiments, the UE 922 and UE 920 can be configured to communicate using OFDM communication signals with each other or with the RAN node 914 and/or the RAN node 916 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 914 and/or the RAN node 916 to the UE 922 and UE 920, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 922 and UE 920 and the RAN node 914 and/or the RAN node 916 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 922 and UE 920 and the RAN node 914 or RAN node 916 may operate using LAA, eLAA, and/or feLAA mechanisms. In these implementations, the UE 922 and UE 920 and the RAN node 914 or RAN node 916 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 922 and UE 920, RAN node 914 or RAN node 916, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 922, AP 912, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 922 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 922 and UE 920. The PDCCH carries information about the transport format and resource allocations related to the PDSCH channel, among other things. It may also inform the UE 922 and UE 920 about the transport format, resource allocation, and HARQ information related to the uplink shared channel. Typically, downlink scheduling (assigning control and shared channel resource blocks to the UE 920 within a cell) may be performed at any of the RAN node 914 or RAN node 916 based on channel quality information fed back from any of the UE 922 and UE 920. The downlink resource assignment information may be sent on the PDCCH used for (e.g., assigned to) each of the UE 922 and UE 920.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 914 or RAN node 916 may be configured to communicate with one another via interface 930. In embodiments where the system 900 is an LTE system (e.g., when CN 906 is an EPC), the interface 930 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 922 from an SeNB for user data; information of PDCP PDUs that were not delivered to a UE 922; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a 5G or NR system (e.g., when CN 906 is an 5GC), the interface 930 may be an Xn interface. The Xn interface is defined between two or more RAN nodes (e.g., two or more gNBs and the like) that connect to 5GC, between a RAN node 914 (e.g., a gNB) connecting to 5GC and an eNB, and/or between two eNBs connecting to 5GC (e.g., CN 906). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 922 in a connected mode (e.g., CM-CONNECTED) including functionality to manage the UE mobility for connected mode between one or more RAN node 914 or RAN node 916. The mobility support may include context transfer from an old (source) serving RAN node 914 to new (target) serving RAN node 916; and control of user plane tunnels between old (source) serving RAN node 914 to new (target) serving RAN node 916. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 908 is shown to be communicatively coupled to a core network-in this embodiment, CN 906. The CN 906 may comprise one or more network elements 932, which are configured to offer various data and telecommunications services to customers/subscribers (e.g., users of UE 922 and UE 920) who are connected to the CN 906 via the (R)AN 908. The components of the CN 906 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 906 may be referred to as a network slice, and a logical instantiation of a portion of the CN 906 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 918 may be an element offering applications that use IP bearer resources with the core network (e.g., UMTS PS domain, LTE PS data services, etc.). The application server 918 can also be configured to support one or more communication services (e.g., VoIP sessions, PTT sessions, group communication sessions, social networking services, etc.) for the UE 922 and UE 920 via the EPC. The application server 918 may communicate with the CN 906 through an IP communications interface 936.

In embodiments, the CN 906 may be an SGC, and the (R)AN 116 may be connected with the CN 906 via an NG interface 934. In embodiments, the NG interface 934 may be split into two parts, an NG user plane (NG-U) interface 926, which carries traffic data between the RAN node 914 or RAN node 916 and a UPF, and the S1 control plane (NG-C) interface 928, which is a signaling interface between the RAN node 914 or RAN node 916 and AMFs.

In embodiments, the CN 906 may be a SG CN, while in other embodiments, the CN 906 may be an EPC). Where CN 906 is an EPC, the (R)AN 116 may be connected with the CN 906 via an S1 interface 934. In embodiments, the S1 interface 934 may be split into two parts, an S1 user plane (S1-U) interface 926, which carries traffic data between the RAN node 914 or RAN node 916 and the S-GW, and the S1-MME interface 928, which is a signaling interface between the RAN node 914 or RAN node 916 and MMEs.

Figure 10:
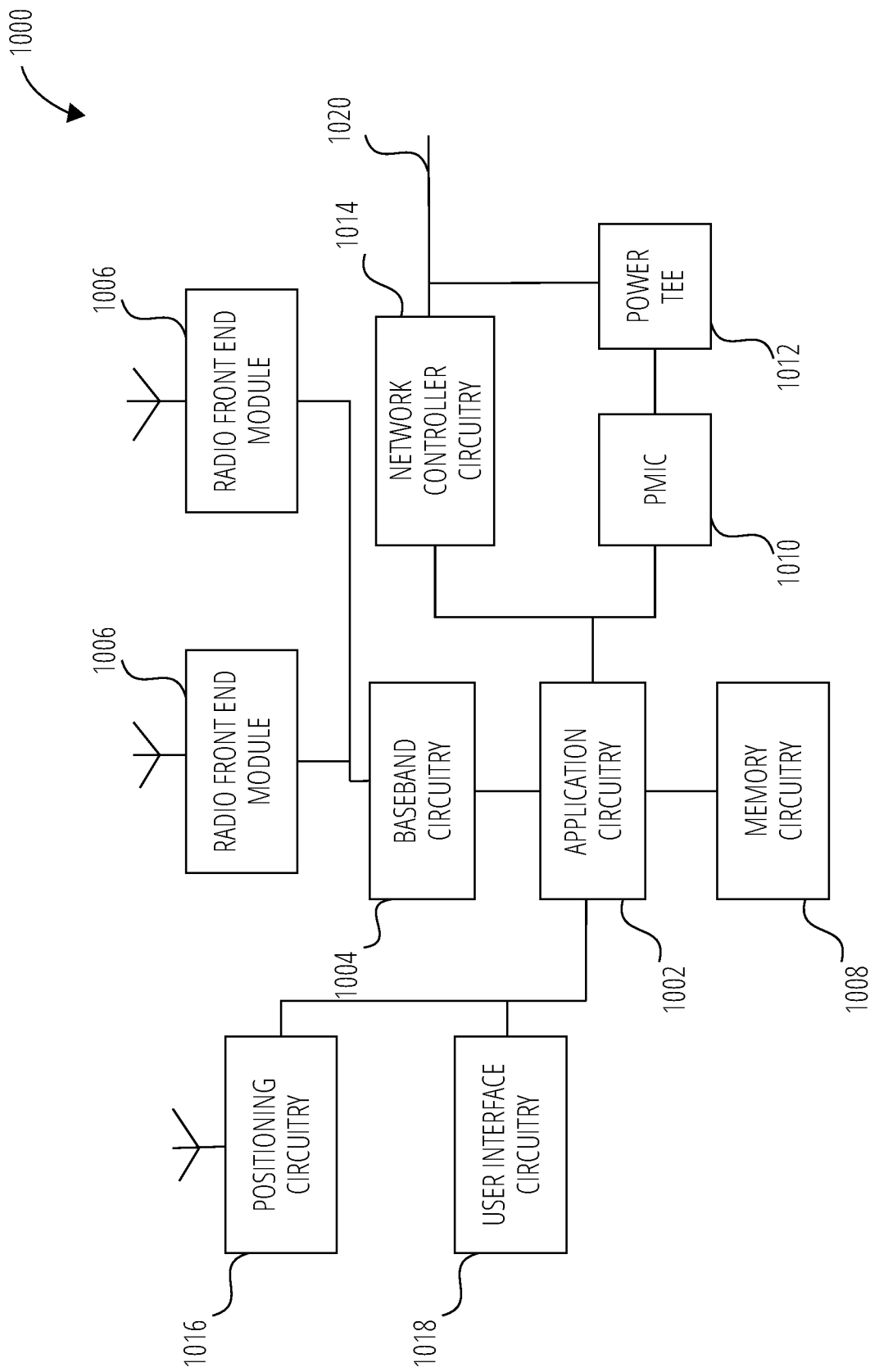
FIG. 10 illustrates infrastructure equipment in accordance with some embodiments.

FIG. 10 illustrates an example of infrastructure equipment 1000 in accordance with various embodiments. The infrastructure equipment 1000 may be implemented as a base station, radio head, RAN node, AN, application server, and/or any other element/device discussed herein. In other examples, the infrastructure equipment 1000 could be implemented in or by a UE.

The infrastructure equipment 1000 includes application circuitry 1002, baseband circuitry 1004, one or more radio front end module 1006 (RFEM), memory circuitry 1008, power management integrated circuitry (shown as PMIC 1010), power tee circuitry 1012, network controller circuitry 1014, network interface connector 1020, satellite positioning circuitry 1016, and user interface circuitry 1018. In some embodiments, the device infrastructure equipment 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1002 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1002 may be coupled with or may include memory/storage elements and may be configured to execute instructions stored in the memory/storage to enable various applications or operating systems to run on the infrastructure equipment 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1002 may comprise, or may be, a special-purpose processor/controller to operate according to the various embodiments herein. As examples, the processor(s) of application circuitry 1002 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1000 may not utilize application circuitry 1002, and instead may include a special-purpose processor/controller to process IP data received from an EPC or SGC, for example.

In some implementations, the application circuitry 1002 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1004 may be implemented, for example, as a solder-down substrate including one or more integrated circuits, a single packaged integrated circuit soldered to a main circuit board or a multi-chip module containing two or more integrated circuits.

The user interface circuitry 1018 may include one or more user interfaces designed to enable user interaction with the infrastructure equipment 1000 or peripheral component interfaces designed to enable peripheral component interaction with the infrastructure equipment 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1008 may be implemented as one or more of solder down packaged integrated circuits, socketed memory modules and plug-in memory cards.

The PMIC 1010 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1012 may provide for electrical power drawn from a network cable to provide both power supply and data connectivity to the infrastructure equipment 1000 using a single cable.

The network controller circuitry 1014 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1020 using a physical connection, which may be electrical (commonly referred to as a "copper interconnect"), optical, or wireless. The network controller circuitry 1014 may include one or more dedicated processors and/or FPGAs to communicate using one or more of the aforementioned protocols. In some implementations, the network controller circuitry 1014 may include multiple controllers to provide connectivity to other networks using the same or different protocols.

The positioning circuitry 1016 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-Technology for Positioning, Navigation, and Timing (Micro-PNT) IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure, or the like. The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 11:
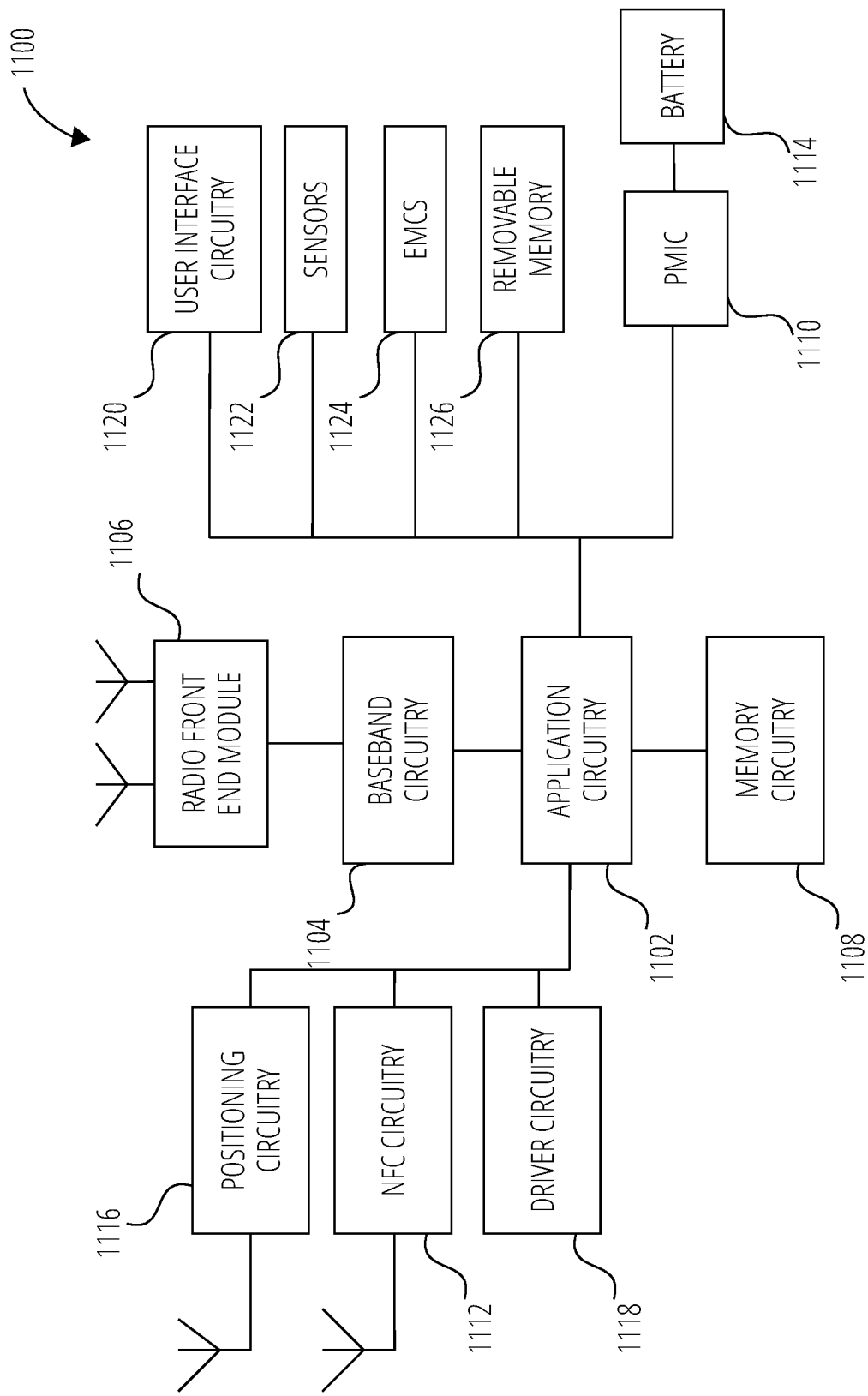
FIG. 11 illustrates a platform in accordance with some embodiments.

FIG. 11 illustrates an example of a platform 1100 in accordance with various embodiments. In embodiments, the computer platform 1100 may be suitable for use as UEs, application servers, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1102 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1102 may be coupled with or may include memory/storage elements and may be configured to execute instructions stored in the memory/storage to enable various applications or operating systems to run on the platform 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1102 may comprise, or may be, a special-purpose processor/controller to operate according to the various embodiments herein.

As examples, the processor(s) of application circuitry 1102 may include an Intel® Architecture Core™ based processor, such as a Quark™, an Atom™, an i3, an i5, an i7, or an MCU-class processor, or another such processor available from Intel® Corporation. The processors of the application circuitry 1102 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1102 may be a part of a system on a chip (SoC) in which the application circuitry 1102 and other components are formed into a single integrated circuit, or a single package, such as the Edison™ or Galileo™ SoC boards from Intel® Corporation.

Additionally or alternatively, application circuitry 1102 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1104 may be implemented, for example, as a solder-down substrate including one or more integrated circuits, a single packaged integrated circuit soldered to a main circuit board or a multi-chip module containing two or more integrated circuits.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include any number and type of memory devices used to provide for a given amount of system memory. As examples, the memory circuitry 1108 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1108 may be developed in accordance with a Joint Electron Devices Engineering Council (JEDEC) low power double data rate (LPDDR)-based design, such as LPDDR2, LPDDR3, LPDDR4, or the like. Memory circuitry 1108 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1108 maybe on-die memory or registers associated with the application circuitry 1102. To provide for persistent storage of information such as data, applications, operating systems and so forth, memory circuitry 1108 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1100 may incorporate the three-dimensional (3D) cross-point (XPOINT) memories from Intel® and Micron®.

The removable memory 1126 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensors 1122 and electro-mechanical components (shown as EMCs 1124), as well as removable memory devices coupled to removable memory 1126.

The sensors 1122 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1124 include devices, modules, or subsystems whose purpose is to enable platform 1100 to change its state, position, and/or orientation, or move or control a mechanism or (sub)system. Additionally, EMCs 1124 may be configured to generate and send messages/signaling to other components of the platform 1100 to indicate a current state of the EMCs 1124. Examples of the EMCs 1124 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1124 based on one or more captured events and/or instructions or control signals received from a service provider and/or various clients. In some implementations, the interface circuitry may connect the platform 1100 with positioning circuitry 1116. The positioning circuitry 1116 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1116 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1116 may include a Micro-PNT IC that uses a master timing clock to perform position tracking/estimation without GNSS assistance. The positioning circuitry 1116 may also be part of, or interact with, the baseband circuitry 1104 and/or radio front end module 1106 to communicate with the nodes and components of the positioning network. The positioning circuitry 1116 may also provide position data and/or time data to the application circuitry 1102, which may use the data to synchronize operations with various infrastructure (e.g., radio base stations), for turn-by-turn navigation applications, or the like.

In some implementations, the interface circuitry may connect the platform 1100 with Near-Field Communication circuitry (shown as NFC circuitry 1112). The NFC circuitry 1112 is configured to provide contactless, short-range communications based on radio frequency identification (RFID) standards, wherein magnetic field induction is used to enable communication between NFC circuitry 1112 and NFC-enabled devices external to the platform 1100 (e.g., an "NFC touchpoint"). NFC circuitry 1112 comprises an NFC controller coupled with an antenna element and a processor coupled with the NFC controller. The NFC controller may be a chip/IC providing NFC functionalities to the NFC circuitry 1112 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1112, or initiate data transfer between the NFC circuitry 1112 and another active NFC device (e.g., a smartphone or an NFC-enabled POS terminal) that is proximate to the platform 1100.

The driver circuitry 1118 may include software and hardware elements that operate to control particular devices that are embedded in the platform 1100, attached to the platform 1100, or otherwise communicatively coupled with the platform 1100. The driver circuitry 1118 may include individual drivers allowing other components of the platform 1100 to interact with or control various input/output (I/O) devices that may be present within, or connected to, the platform 1100. For example, driver circuitry 1118 may include a display driver to control and allow access to a display device, a touchscreen driver to control and allow access to a touchscreen interface of the platform 1100, sensor drivers to obtain sensor readings of sensors 1122 and control and allow access to sensors 1122, EMC drivers to obtain actuator positions of the EMCs 1124 and/or control and allow access to the EMCs 1124, a camera driver to control and allow access to an embedded image capture device, audio drivers to control and allow access to one or more audio devices.

The power management integrated circuitry (shown as PMIC 1110) (also referred to as "power management circuitry") may manage power provided to various components of the platform 1100. In particular, with respect to the baseband circuitry 1104, the PMIC 1110 may control power-source selection, voltage scaling, battery charging, or DC-to-DC conversion. The PMIC 1110 may often be included when the platform 1100 is capable of being powered by a battery 1114, for example, when the device is included in a UE.

In some embodiments, the PMIC 1110 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1114 may power the platform 1100, although in some examples the platform 1100 may be mounted deployed in a fixed location, and may have a power supply coupled to an electrical grid. The battery 1114 may be a lithium ion battery, a metal-air battery, such as a zinc-air battery, an aluminum-air battery, a lithium-air battery, and the like. In some implementations, such as in V2X applications, the battery 1114 may be a typical lead-acid automotive battery.

In some implementations, the battery 1114 may be a "smart battery," which includes or is coupled with a Battery Management System (BMS) or battery monitoring integrated circuitry. The BMS may be included in the platform 1100 to track the state of charge (SoCh) of the battery 1114. The BMS may be used to monitor other parameters of the battery 1114 to provide failure predictions, such as the state of health (SoH) and the state of function (SoF) of the battery 1114. The BMS may communicate the information of the battery 1114 to the application circuitry 1102 or other components of the platform 1100. The BMS may also include an analog-to-digital (ADC) convertor that allows the application circuitry 1102 to directly monitor the voltage of the battery 1114 or the current flow from the battery 1114. The battery parameters may be used to determine actions that the platform 1100 may perform, such as transmission frequency, network operation, sensing frequency, and the like.

A power block, or other power supply coupled to an electrical grid may be coupled with the BMS to charge the battery 1114. In some examples, the power block may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1114, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1120 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1120 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensors 1122 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 12:
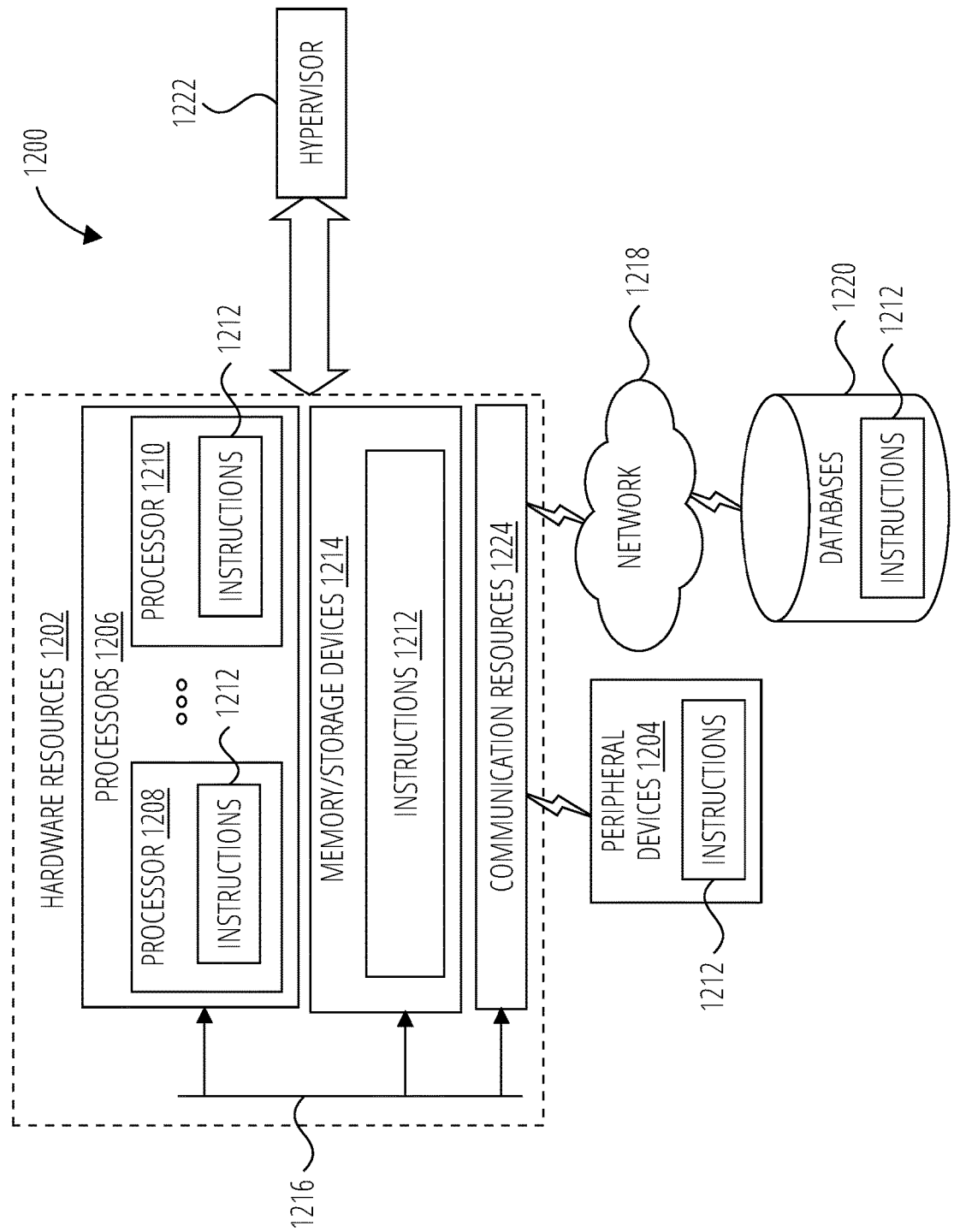
FIG. 12 illustrates system components in accordance with some embodiments.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1206 (or processor cores), one or more memory/storage devices 1214, and one or more communication resources 1224, each of which may be communicatively coupled via a bus 1216. For embodiments where node virtualization (e.g., NFV) is utilized, a hypervisor 1222 may be executed to provide an execution environment for one or more network slices/sub-slices to utilize the hardware resources 1202.

The processors 1206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1208 and a processor 1210.

The memory/storage devices 1214 may include main memory, disk storage, or any suitable combination thereof. The memory/storage devices 1214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1224 may include interconnection or network interface components or other suitable devices to communicate with one or more peripheral devices 1204 or one or more databases 1220 via a network 1218. For example, the communication resources 1224 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1212 may comprise software, a program, an application, an applet, an app, or other executable code for causing at least any of the processors 1206 to perform any one or more of the methodologies discussed herein. The instructions 1212 may reside, completely or partially, within at least one of the processors 1206 (e.g., within the processor's cache memory), the memory/storage devices 1214, or any suitable combination thereof. Furthermore, any portion of the instructions 1212 may be transferred to the hardware resources 1202 from any combination of the peripheral devices 1204 or the databases 1220. Accordingly, the memory of the processors 1206, the memory/storage devices 1214, the peripheral devices 1204, and the databases 1220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method for grouping component carrier (CC) signals for a wireless communication system, the method comprising determining a frequency separation that defines a frequency range from a lower bound frequency to a higher bound frequency for each CC group of a plurality of CC groups, wherein a difference between the lower bound frequency and the higher bound frequency of each CC group is equal to the frequency separation, determining a frequency of a first CC from a collection of CCs, and assigning the first CC to a first CC group, of the plurality of CC groups, wherein the first CC group has a frequency range that includes the frequency of the first CC.

Example 2 may include the method of Example 1, further comprising determining a frequency of a second CC from the collection of CCs.

Example 3 may include the method of Example 2, wherein the frequency of the first CC is lower than the frequency of the second CC.

Example 4 may include the method of Example 2, wherein the frequency of the first CC is higher than the frequency of the second CC.

Example 5 may include the method of Example 2, further comprising assigning the second CC to a second CC group, of the plurality of CC groups, wherein the second CC group has a frequency range that includes the frequency of the second CC and does not include the frequency of the first CC.

Example 6 may include the method of Example 5, further comprising determining a frequency of a third CC from the collection of CCs, and assigning the third CC to the first CC group, wherein the first CC group has a frequency range that includes the frequency of the third CC.

Example 7 may include the method of Example 6, wherein a single quality measurement of the first CC or the third CC in the first group is representative of a quality of both the first CC and the third CC.

Example 8 may include the method of Example 1, wherein a single quality measurement of the first CC in the first group is representative of a quality of all CCs that are assigned to the first group.

Example 9 may include the method of Example 1, wherein the number of CCs assigned to each CC group does not exceed a predetermined threshold.

Example 10 may include the method of Example 1, wherein the number of CCs assigned to each CC group of the plurality of CC groups is not fixed.

Example 11 may include the method of Example 1, wherein the number of CCs assigned to each CC group of the plurality of CC groups is not limited.

Example 12 may include the method of Example 1, wherein a frequency domain non-contiguity of the first CC does not impact the assigning of the first CC.

Example 13 may include the method of Example 1, wherein the first CC being a primary component carrier (PCC) or a secondary component carrier (SCC) does not impact the assigning of the first CC.

Example 14 may include the method of Example 1, wherein the plurality of CC groups are contiguous in the frequency domain.

Example 15 may include a non-transitory computer-readable storage medium, the computer-readable storage medium including instructions that when executed by a processor, cause the processor to: determine a frequency separation that defines a frequency range from a lower bound frequency to a higher bound frequency for each CC group of a plurality of CC groups, wherein a difference between the lower bound frequency and the higher bound frequency of each CC group is equal to the frequency separation, determine a frequency of a first CC from a collection of CCs, and assign the first CC to a first CC group, of the plurality of CC groups, wherein the first CC group has a frequency range that includes the frequency of the first CC.

Example 16 may include the non-transitory computer-readable storage medium of Example 15, wherein the instructions, when executed by the processor, further cause the processor to: determine a frequency of a second CC from the collection of CCs, and assign the second CC to the first CC group, wherein the first CC group has a frequency range that includes the frequency of the second CC, wherein a single quality measurement of the first CC or the second CC in the first group is representative of a quality of both the first CC and the second CC.

Example 17 may include the non-transitory computer-readable storage medium of Example 15, wherein a single quality measurement of the first CC in the first group is representative of a quality of all CCs that are assigned to the first group.

Example 18 may include a computing apparatus for grouping component carrier (CC) signals for a wireless communication system, the computing apparatus comprising: a processor; and a memory storing instructions that, when executed by the processor, configure the apparatus to: determine a frequency separation that defines a frequency range from a lower bound frequency to a higher bound frequency for each CC group of a plurality of CC groups, wherein a difference between the lower bound frequency and the higher bound frequency of each CC group is equal to the frequency separation, determine a frequency of a first CC from a collection of CCs, and assign the first CC to a first CC group, of the plurality of CC groups, wherein the first CC group has a frequency range that includes the frequency of the first CC.

Example 19 may include the computing apparatus of Example 18, wherein the instructions, when executed by the processor, further configure the apparatus to: determine a frequency of a second CC from the collection of CCs, and assign the second CC to the first CC group, wherein the first CC group has a frequency range that includes the frequency of the second CC, wherein a single quality measurement of the first CC or the second CC in the first group is representative of a quality of both the first CC and the second CC.

Example 20 may include the computing apparatus of Example 18, wherein a single quality measurement of the first CC in the first group is representative of a quality of all CCs that are assigned to the first group.

Example 21 may include a method for grouping component carrier (CC) signals for a wireless communication system, the method comprising: determining that a plurality of CCs is contiguous with at least one other CC, determining a frequency separation that defines a frequency range from a lower bound frequency to a higher bound frequency for each group of a plurality of CC groups for the plurality of contiguous CCs, wherein a difference between the lower bound frequency and the higher bound frequency of each CC group is equal to the frequency separation, determining a frequency of a first CC from the plurality of contiguous CCs, and assigning the first CC to a first CC group, of the plurality of CC groups, wherein the first CC group has a frequency range that includes the frequency of the first CC.

Example 22 may include the method of Example 21, further comprising determining that one or more CCs are not contiguous with at least one other CC.

Example 23 may include a method for grouping component carrier (CC) signals for a wireless communication system, the method comprising: determining a grouping factor associated with a range of adjacent CCs relative to a center CC, determining a grouping size using the grouping factor, where the grouping size indicates a plurality of CCs that share a single representative measurement result, determining that a first target CC is contiguous with one or more other CCs, assigning the first target CC to a first contiguous CC group, determining that a number of CCs of the first contiguous CC group is equal to the grouping size, determining that a second target CC is contiguous with one or more other CCs, and assigning the second target CC to a second contiguous CC group.

Example 24 may include the method of Example 23, further comprising determining that a third target CC is not contiguous with at least one other CC, and assigning the third target CC to a non-contiguous CC group.

Example 25 may include a method for grouping component carrier (CC) signals for a wireless communication system, the method comprising: determining that a first target CC is contiguous with at least one other CC, assigning the first target CC to a contiguous CC group, determining that a second target CC is not contiguous with at least one other CC, and assigning the second target CC to a non-contiguous CC group, wherein a quality measurement of a single CC from the contiguous CC group represents a quality measurement of each CC of the contiguous CC group.

Example 26 may include the method of Example 25, wherein the first target CC is a secondary component carrier (SCC) and the second target CC is a primary component carrier (PCC).

Example 27 may include a method for configuring a user equipment (UE) in a wireless communication system, the method comprising: determining a total number of component carrier (CC) signals available for monitoring by the UE, determining the number of CCs that the UE will monitor of the total number of CCs that are available, and determining an identity of each CC of the number of CCs that the UE will monitor, wherein the identity corresponds to an index of each CC of the number of CCs that the UE will monitor.

Example 28 may include the method of Example 27, wherein the identity of each CC of the number of CCs that the UE will monitor is determined randomly.

Example 29 may include an apparatus comprising means to perform one or more elements of a method described in or related to any of the above Examples, or any other method or process described herein.

Example 30 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 31 may include an apparatus comprising logic, modules, or circuitry to perform one or more elements of a method described in or related to any of the above Examples, or any other method or process described herein.

Example 32 may include a method, technique, or process as described in or related to any of the above Examples, or portions or parts thereof.

Example 33 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 34 may include a signal as described in or related to any of the above Examples, or portions or parts thereof.

Example 35 may include a datagram, packet, frame, segment, protocol data unit (PDU), or message as described in or related to any of the above Examples, or portions or parts thereof, or otherwise described in the present disclosure.

Example 36 may include a signal encoded with data as described in or related to any of the above Examples, or portions or parts thereof, or otherwise described in the present disclosure.

Example 37 may include a signal encoded with a datagram, packet, frame, segment, PDU, or message as described in or related to any of the above Examples, or portions or parts thereof, or otherwise described in the present disclosure.

Example 38 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 39 may include a computer program comprising instructions, wherein execution of the program by a processing element is to cause the processing element to carry out the method, techniques, or process as described in or related to any of the above Examples, or portions thereof.

Example 40 may include a signal in a wireless network as shown and described herein.

Example 41 may include a method of communicating in a wireless network as shown and described herein.

Example 42 may include a system for providing wireless communication as shown and described herein.

Example 43 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for grouping component carrier (CC) signals for a wireless communication system, the method comprising:
    determining a frequency separation that defines a frequency range from a lower bound frequency to a higher bound frequency for each CC group of a plurality of CC groups, wherein a difference between the lower bound frequency and the higher bound frequency of each CC group is equal to the frequency separation;
    determining a frequency of a first CC from a collection of CCs;
    determining whether the first CC is contiguous with other CCs or non-contiguous with the other CCs;
    if the first CC is non-contiguous with the other CCs, assigning the first CC to a non-contiguous group; and
    if the first CC is contiguous with at least one of the other CCs, assigning the first CC to a first CC group that is contiguous, of the plurality of CC groups, wherein the first CC group has a frequency range that includes the frequency of the first CC,
    wherein a single quality measurement of a center CC in the first CC group is representative of a quality of all CCs that are assigned to the first CC group.

2. The method of claim 1, further comprising determining a frequency of a second CC from the collection of CCs.

3. The method of claim 2, wherein the frequency of the first CC is lower than the frequency of the second CC.

4. The method of claim 2, wherein the frequency of the first CC is higher than the frequency of the second CC.

5. The method of claim 2, further comprising assigning the second CC to a second CC group, of the plurality of CC groups, wherein the second CC group has a frequency range that includes the frequency of the second CC and does not include the frequency of the first CC.

6. The method of claim 5, further comprising:
    determining a frequency of a third CC from the collection of CCs; and
    assigning the third CC to the first CC group, wherein the first CC group has a frequency range that includes the frequency of the third CC.

7. The method of claim 1, wherein a number of CCs assigned to each CC group does not exceed a predetermined threshold.

8. The method of claim 1, wherein a number of CCs assigned to each CC group of the plurality of CC groups is not fixed.

9. The method of claim 1, wherein a number of CCs assigned to each CC group of the plurality of CC groups is not limited.

10. The method of claim 1, wherein the first CC being a primary component carrier (PCC) or a secondary component carrier (SCC) does not impact the assigning of the first CC.

11. The method of claim 1, wherein the plurality of CC groups except for the non-contiguous group are contiguous in a frequency domain.

12. A non-transitory computer-readable storage medium, the computer-readable storage medium including instructions that when executed by a processor, cause the processor to:
    determine a frequency separation that defines a frequency range from a lower bound frequency to a higher bound frequency for each CC group of a plurality of CC groups, wherein a difference between the lower bound frequency and the higher bound frequency of each CC group is equal to the frequency separation;
    determine a frequency of a first CC from a collection of CCs;
    determining whether the first CC is contiguous with other CCs or non-contiguous with the other CCs;
    if the first CC is non-contiguous with the other CCs, assigning the first CC to a non-contiguous group; and
    if the first CC is contiguous with at least one of the other CCs, assign the first CC to a first CC group that is contiguous, of the plurality of CC groups, wherein the first CC group has a frequency range that includes the frequency of the first CC,
    wherein a single quality measurement of a center CC in the first CC group is representative of a quality of all CCs that are assigned to the first CC group.

13. The non-transitory computer-readable storage medium of claim 12, wherein the instructions, when executed by the processor, further cause the processor to:
    determine a frequency of a second CC from the collection of CCs; and
    assign the second CC to the first CC group, wherein the first CC group has a frequency range that includes the frequency of the second CC.

14. A computing apparatus for grouping component carrier (CC) signals for a wireless communication system, the computing apparatus comprising:
    a processor; and
    a memory storing instructions that, when executed by the processor, configure the apparatus to:
    determine a frequency separation that defines a frequency range from a lower bound frequency to a higher bound frequency for each CC group of a plurality of CC groups, wherein a difference between the lower bound frequency and the higher bound frequency of each CC group is equal to the frequency separation;
    determine a frequency of a first CC from a collection of CCs;

determining whether the first CC is contiguous with other CCs or non-contiguous with the other CCs;

if the first CC is non-contiguous with the other CCs, assigning the first CC to a non-contiguous group; and if the first CC is contiguous with at least one of the other CCs, assign the first CC to a first CC group that is contiguous, of the plurality of CC groups, wherein the first CC group has a frequency range that includes the frequency of the first CC, wherein a single quality measurement of a center CC in the first CC group is representative of a quality of all CCs that are assigned to the first CC group.

15. The computing apparatus of claim 14, wherein the instructions, when executed by the processor, further configure the apparatus to:

determine a frequency of a second CC from the collection of CCs; and assigning the second CC to the first CC group, wherein the first CC group has a frequency range that includes the frequency of the second CC.

* * * * *